United States Patent
Iizuka et al.

(10) Patent No.: US 7,424,487 B2
(45) Date of Patent: Sep. 9, 2008

(54) BULLETIN BOARD SYSTEM (BBS) IMPLEMENTED ON SERVER COMPUTER IN WHICH BBS ITEMS ARE STORED AS FILES IN ACCORDANCE WITH NATIVE FILE SYSTEM OF SERVER COMPUTER

(75) Inventors: Hiroyuki Iizuka, Chichibu (JP); Toshio Sohya, Tokyo-to (JP); Kayoko Suda, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 11/023,975

(22) Filed: Dec. 28, 2004

(65) Prior Publication Data

US 2006/0143192 A1 Jun. 29, 2006

(51) Int. Cl.
*G06F 17/00* (2006.01)
*G06F 17/30* (2006.01)

(52) U.S. Cl. .................. 707/102; 707/10; 707/101; 707/104.1

(58) Field of Classification Search .............. 707/10, 707/100–102, 104.1
See application file for complete search history.

(56) References Cited

U.S. PATENT DOCUMENTS

| | | | |
|---|---|---|---|
| 5,724,567 A * | 3/1998 | Rose et al. ................ 707/2 |
| 5,793,966 A * | 8/1998 | Amstein et al. ........... 709/203 |
| 5,923,846 A * | 7/1999 | Gage et al. ............... 709/213 |
| 5,991,760 A * | 11/1999 | Gauvin et al. ............. 707/10 |
| 6,226,648 B1 * | 5/2001 | Appleman et al. ........ 715/513 |
| 6,438,632 B1 * | 8/2002 | Kikugawa ................. 715/530 |

(Continued)

FOREIGN PATENT DOCUMENTS

JP 11259510 A 9/1999

(Continued)

OTHER PUBLICATIONS

"AZ Hierarchical Architecture for Behavior-Based Robots"—MOnica N. Nicolescu and Maja J. Mataric—International Conference on Aotonomous Agents—Proceddings of the 1st International Joint Conference on Aotonomous agents and Multiagent Systems ACM—2002, pp. 227-233.*

(Continued)

*Primary Examiner*—Jean Bolte Fleurantin
*Assistant Examiner*—Anh Ly (57) ABSTRACT

A bulletin board system (BBS) is implemented on a server computer without employing database management software (DBMS). A hierarchical directory structure is defined in which there are directories and sub-directories into which BBS items are individually storable as files in accordance with the native file system of the server computer. In response to receiving a request from a client computer to post a BBS item, the BBS item is received as an individually storable file, and the file is stored within one of the directories and sub-directories. In response to receiving a request from a client computer to view the BBS, the client computer is sent a representation of the hierarchical directory structure, including filenames of the files for the BBS items stored within the directories and sub-directories. When a request is received for a particular BBS item, the client computer is sent the file for that particular BBS item.

17 Claims, 6 Drawing Sheets

U.S. PATENT DOCUMENTS

| | | | |
|---|---|---|---|
| 6,795,831 B2* | 9/2004 | Hirose et al. | 707/201 |
| 6,901,433 B2* | 5/2005 | San Andres et al. | 707/200 |
| 7,111,042 B2* | 9/2006 | Kikugawa | 709/204 |
| 2001/0018704 A1* | 8/2001 | Kikugawa | 709/203 |
| 2002/0047868 A1* | 4/2002 | Miyazawa | 345/835 |
| 2002/0133720 A1* | 9/2002 | Sherman et al. | 713/201 |
| 2002/0143776 A1* | 10/2002 | Hirose et al. | 707/10 |
| 2003/0088568 A1* | 5/2003 | Matsunaga et al. | 707/10 |
| 2003/0225726 A1* | 12/2003 | Simpson et al. | 707/1 |
| 2004/0107159 A1* | 6/2004 | Heil | 705/37 |
| 2004/0143571 A1* | 7/2004 | Bjornson et al. | 707/3 |
| 2005/0027797 A1* | 2/2005 | San Andres et al. | 709/203 |
| 2005/0210145 A1* | 9/2005 | Kim et al. | 709/219 |
| 2007/0050459 A1* | 3/2007 | Kikugawa | 709/206 |
| 2007/0061425 A1* | 3/2007 | Yamamoto et al. | 709/219 |

FOREIGN PATENT DOCUMENTS

| | | |
|---|---|---|
| JP | 2002108759 A | 4/2002 |
| JP | 2002123467 A | 4/2002 |
| JP | 2003173310 A | 6/2003 |
| JP | 2003242078 A | 8/2003 |
| JP | 2003296237 A | 10/2003 |

OTHER PUBLICATIONS

"Witan web and the software engineering of web-based applications"—J. Howard Johnson and Stephen A. Mackay—IBM Centre for Advanced Studies Conference ACM- 2000, pp. 1-15.*

N. McLain, "What is a Directory Service?", http://support.novell.com/techcenter/articles/anp20000501.html, May 12, 2000.

* cited by examiner

BULLETIN BOARD SYSTEM (BBS) IMPLEMENTED ON SERVER COMPUTER IN WHICH BBS ITEMS ARE STORED AS FILES IN ACCORDANCE WITH NATIVE FILE SYSTEM OF SERVER COMPUTER

FIELD OF THE INVENTION

The present invention relates generally to electronic bulletin board systems (BBS's), and more particularly to implementing such BBS's on server computers such that BBS items are stored as files in accordance with the native file systems of the server computers.

BACKGROUND OF THE INVENTION

Traditionally, information was disseminated within corporations and other such organizations by paper memorandums, or memos. Changes in human resources (HR) policies, for instance, may have been printed on a sheet a paper. That sheet of paper would then be photocopied a large number of times, and the copies disseminated to all of the employees within the corporation. Such paper distribution of memo copies can be expensive and time-consuming, however, especially when an organization has thousands of employees or more.

More recently, electronic bulletin board systems (BBS's) have become popular as a way to replace traditional manners by which to disseminate information within organizations. BBS's are generally and non-restrictively defined herein as computerized systems that receive and store information posted by users, where users are able to view the information as needed. Thus, users can view changes in HR policies and other information on their computers, so that paper copies of memos no longer have to be circulated.

Electronic BBS's have grown in complexity as their features have increased. For instance, many BBS's allow for checking or verification of posted data, such as spell checking, as well as email notification when changes to the data or replies to the posted data have occurred. Other BBS's may translate data received from users in one format into another format amenable to viewing by a larger number of users. Relevancy management and other features are present in still other BBS's.

As a result, electronic BBS's typically require powerful, but expensive, software for their implementation. Typically, for instance, most electronic BBS's require database management software (DBMS) to manage their data postings, which are referred to herein as BBS items. DBMS is software that controls the organization, storage, retrieval, security and integrity of data in a database. It accepts requests from applications and instructs the operating system to transfer the appropriate data as needed. Examples of software that provide for electronic BBS's in this regard are Lotus® Domino® server software, available from International Business Machines Corp., of Armonk, N.Y., and Microsoft® SharePoint®, available from Microsoft Corp., of Redmond, Wash.

Using such BBS software, however, can be disadvantageous. First, the software is expensive, preventing it from being used by cost-conscious organizations. Second, the software is complex, and therefore may require specially trained administrators to set up and maintain the software. Third, the software may have relatively stringent hardware requirements, such that only relatively powerful server computers, for instance, can be used to run the software. An organization may thus have to upgrade its server computers, which are so-called "backend" systems, in order to run BBS software. For these and other reasons, therefore, there is a need for the present invention.

SUMMARY OF THE INVENTION

The present invention relates to an electronic bulletin board system (BBS). A method of the invention implements a BBS on a server computer without employing database management software (DBMS). A hierarchical directory structure is defined in which there are directories and sub-directories into which BBS items are individually storable as files in accordance with the native file system of the server computer. The files are directly openable and viewable by one or more application programs.

In response to receiving a request from a client computer to post a BBS item on the BBS, the BBS item is received as an individually storable file that is directly openable and viewable by one or more application programs. The file for the BBS item is stored within one of the directories and sub-directories of the hierarchical data structure as specified by the client computer. In one embodiment, an applet configured to allow a user at the client computer to navigate the native file system of the client computer to select the file for the BBS item to be posted may be sent to the client computer, and run within a web browser computer program on the client computer.

In response to receiving a request from a client computer to view the BBS, the client computer is sent a representation of the hierarchical directory structure, including filenames of the files for the BBS items stored within the directories and sub-directories of the hierarchical directory structure. When a request is received from the client computer for a particular BBS item, the client computer is sent the file for that particular BBS item. In one embodiment, an applet configured to allow a user at the client computer to navigate the hierarchical directory structure to select the file for the particular BBS item may be sent to the client computer, and run within a web browser computer program on the client computer.

A system of the invention includes a network, a server computer, and one or more client computers. The server computer and the client computers are communicatively coupled to the network. The server computer has a BBS implemented thereon without use of DBMS, and in which BBS items are stored as individually storable files within a hierarchical directory structure having directories and sub-directories, using a native file system of the server computer. Each client computer is able to send requests to the server computer over the network to view the BBS. In response, such a client computer receives from the server computer a representation of the hierarchical directory structure, including filenames of the files for the BBS items stored within the directories and sub-directories of the hierarchical directory structure.

A server computer of the invention includes one or more processors, a network communication mechanism, a storage device, and a computer program. The network communication mechanism communicatively couples the server computer to a network. The storage device stores BBS items as individual files within a hierarchical directory structure having directories and sub-directories, in accordance with the native file system of the server computer. The files are directly openable and viewable by one or more computer programs. The computer program is executed by the processors to receive from client computers over the network the BBS items to store as the individual files within the hierarchical directory structure, and to send to the client computers over the network a representation of the hierarchical directory structure and the individual files for particular of the BBS items requested by the client computers.

An article of manufacture of the invention includes a computer-readable medium and means in the medium. The medium may be a recordable data storage medium, a modulated carrier signal, or another type of computer-readable medium. The means is for implementing a BBS on a server computer using the native file system of the server computer to store BBS items as individually storable files within a hierarchical directory structure having directories and sub-directories.

Embodiments of the invention provide for advantages over the prior art. Unlike prior art BBS's, embodiments of the invention do not require costly and complicated DBMS. Rather, the invention uses the native file system of a server computer itself to organize the BBS items, which are the data postings provided by users of the BBS. Thus, a hierarchical directory structure is defined that contains directories and sub-directories, and the BBS items are stored as individual files within those directories and sub-directories. Complicated maintenance of the BBS is not required, because the data of the BBS itself is easily viewed, backed up, and so on, just like any other data stored within the native file system of the server computer.

Still other advantages, aspects, arid embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
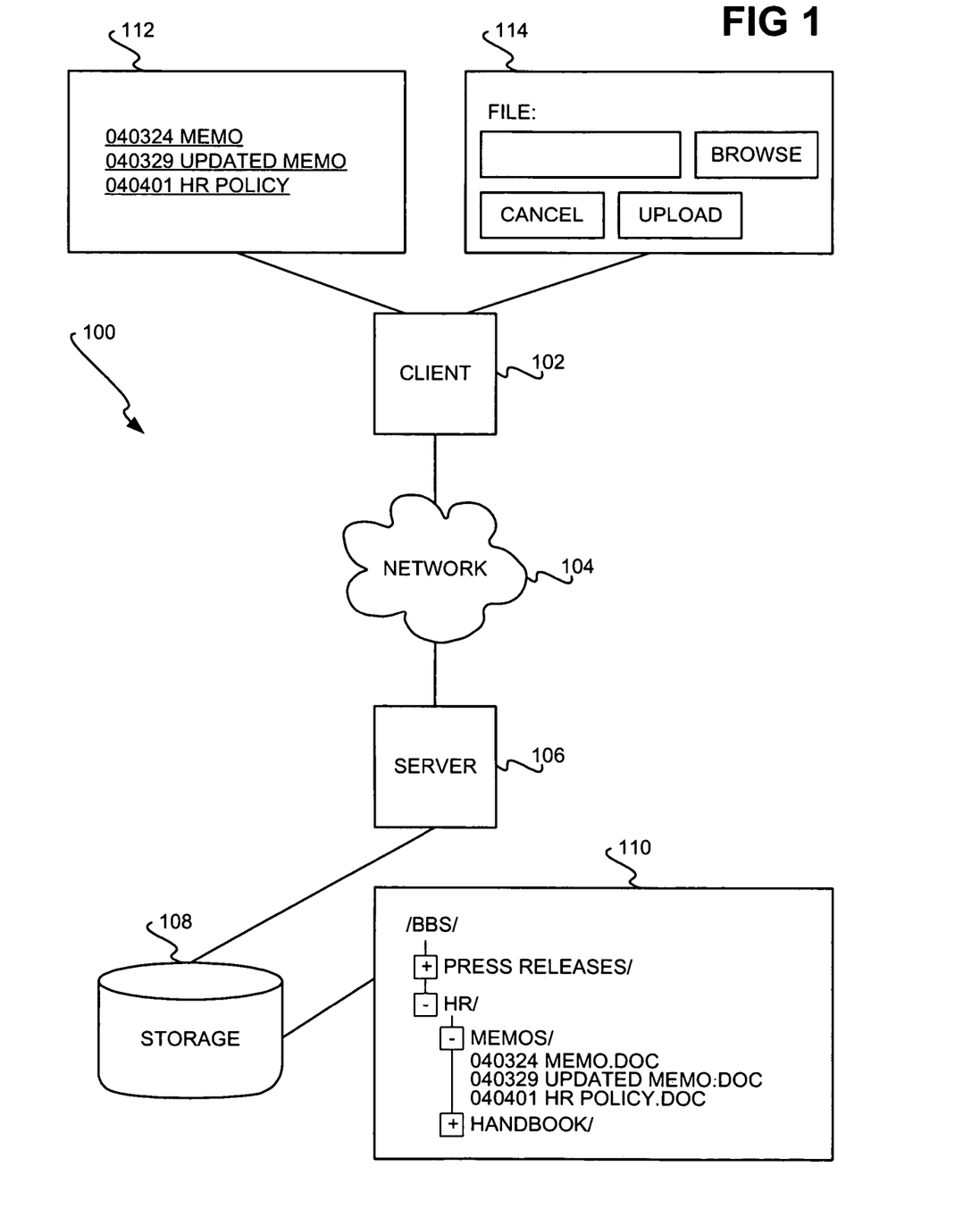
FIG. 1 is a diagram of a system in which a bulletin board system (BBS) is implemented on a server computer, according to an embodiment of the invention, and is suggested for printing on the first page of the patent.

FIG. 1 shows a system 100, according to an embodiment of the invention. The system 100 is depicted as including a client computing device 102 and a server computing device 106 that are communicatively coupled to one another via a network 104. The network 104 may be or include one or more of a wired network, a wireless network, an Ethernet network, an intranet, an extranet, the Internet, and a telephony network, among other types of networks. Although only one client computing device 102 and only one server computing device 106 is depicted in FIG. 1, in other embodiments there can be and typically are more than one client computing device 102, and there may be more than one server computing device 106 as well. The client computing device may be a laptop, notebook, desktop, or other type of computing device, as well as a personal digital assistant (PDA) device, a mobile or cellular telephony device, or another type of computing device.

The server computing device 106 includes or is communicatively coupled to a storage device 108, such as one or more hard disk drives or other type of non-volatile storage. The storage device 108 is formatted for the storage of files in accordance with a native file system of the server computing device 106. For instance, where the server computing device 106 runs a version of the Microsoft® Windows® operating system, available from Microsoft Corp., of Redmond, Wash., the native file system may be the NT file system (NTFS), or the 32-bit file-allocation table (FAT32) file system.

The native file system of a computing device is the manner by which the computing device is inherently able to store data files. That is, the native file system of a computing device is the method for storing and retrieving files on a disk. A file system defines the directory structure for keeping track of the files and the path syntax required to access them. It also defines the way files are named as well as the maximum size of a file or volume. That a file system is a native file system means that the operating system of the computing device inherently supports the file system, without extra software being loaded onto the computing device.

The BBS is defined within the system 100 as including a collection of BBS items stored as individual files in accordance with the native file system of the server computing device 106 within a hierarchical directory structure. FIG. 1 depicts an example hierarchical directory structure 110. Within the directory BBS are the sub-directories PRESS RELEASES and HR. Within the sub-directory HR are further sub-directories MEMOS and HANDBOOK. The BBS items are stored as individual files within the hierarchical directory structure 110. For instance, within the sub-directory MEMOS are the files "040324 MEMO.DOC," "040329 UPDATED MEMO.DOC," and "040401 HR POLICY.DOC." Each of these files represents a separate BBS item, which is a separate posting of data by a user of the BBS via a client computer device, such as the client computer device 102.

The files of the BBS items preferably have filenames descriptive of the contents of the BBS items in a humanly understandable manner. For instance, the BBS item represented by the file "040324 MEMO.DOC" is a memorandum, as is the BBS item represented by the file "040329 UPDATED MEMO.DOC." Similarly, the BBS item represented by the file "040401 HR POLICY.DOC." is a human resources (HR) policy. Furthermore, the filenames preferably include the date at which the respective BBS items were posted to the BBS, such as in the format YYMMDD. For example, the BBS item represented by the file "040324 MEMO.DOC" may have been posted on Mar. 24, 2004, and the BBS item represented by the file "040329 UPDATED MEMO.DOC" may have been posted on Mar. 29, 2004. Similarly, the BBS item represented by the file "040401 HR POLICY.DOC" may have been posted on Apr. 1, 2004.

The files of the BBS items are directly openable and viewable by one or more application computer programs on the client computer devices, such as the client computer device 102. For example, files ending in the suffix ".DOC" may be openable by word processing computer programs, such as versions of the Microsoft® Word® word-processing computer program available from Microsoft Corp. That the files are directly openable and viewable means that they do not have to be parsed or translated by another piece of software in order to be opened and viewed via an application computer program. For example, database management software (DBMS) is not needed to first extract the file in question before opening the file in a word processing program.

Thus, the BBS system is implemented within the system 100, specifically on the server computer device 106, without employing DBMS. The BBS items are directly stored as individual files within the hierarchical directory structure on a storage device of or communicatively connected to the server computer device 106. The BBS items are sorted within this hierarchical directory structure. Their files can be opened with appropriate application computer programs without having to extract them using DBMS or another type of software.

The client computer device 102 interacts with the server computer device 106 over the network 104 to view BBS items and post BBS items as follows. First, the client computer device 102 retrieves a representation of the hierarchical directory structure 110 of the BBS system as stored by the server computer 106 on the storage device 108. This enables the client computer device 102 to display the contents of the hierarchical directory structure 110 to a user. For instance, the example window 112 shows a partial display of the directory structure 110, specifically of the MEMOS sub-directory of the HR sub-directory. In one embodiment, the filename suffixes, like ".DOC" are suppressed during display. The user may then simply click on any of the BBS items to cause that item to be downloaded from the server computer device 106 to the client computer device 102 for display.

For posting BBS items, the example window 114 shows a filename box by a BROWSE button. The user selects the BROWSE button, navigates the (native) file system of the client computer device 102 for a desired data file that has been created with an application computer program on the computer device 102, and then selects the UPLOAD button to cause this data file to be uploaded to the server computer device 106. The user may have already selected the desired sub-directory or directory within the hierarchical data structure 110 within which this data file is to be stored as an individual file in accordance with the native file system of the server computer device 106. Thus, the BBS system is operative by users sending data files for storage within the hierarchical data structure 110, and for retrieving data files already stored within this structure 110, via client computer devices like the device 102.

Preferably, the client computer device 102 interacts with the server computer device 106 via one or more applet computer programs running within the context of a web browser computer program, like versions of the Microsoft® Internet Explorer® web browser computer program, available from Microsoft Corp. An applet is a small computer program. In one embodiment, the applets may be created in a programming language like the Java computer programming language. Therefore, the BBS system can be implemented using Internet technology like Java applets, running within the context of web browser programs, so that no special-purpose computer programs need to be loaded onto the client computer device 102 a priori. That is, the applets may be transferred from the server computer device 106 to the client computer device 102 as needed.

Other technologies that may be used to implement the BBS include Java server pages (JSP's) and JavaBean software components. A JSP is an extension to Java servlet technology that allows hypertext markup language (HTML) to be combined with Java on the same web page. The Java provides the processing, and the HTML provides the page layout that will be rendered in the Web browser. A Java servlet is a Java application that runs on a server and provides server-side processing. A JavaBean is a component software architecture that runs in the Java environment. JavaBeans are independent Java program modules that are called for and executed.

Figure 2:
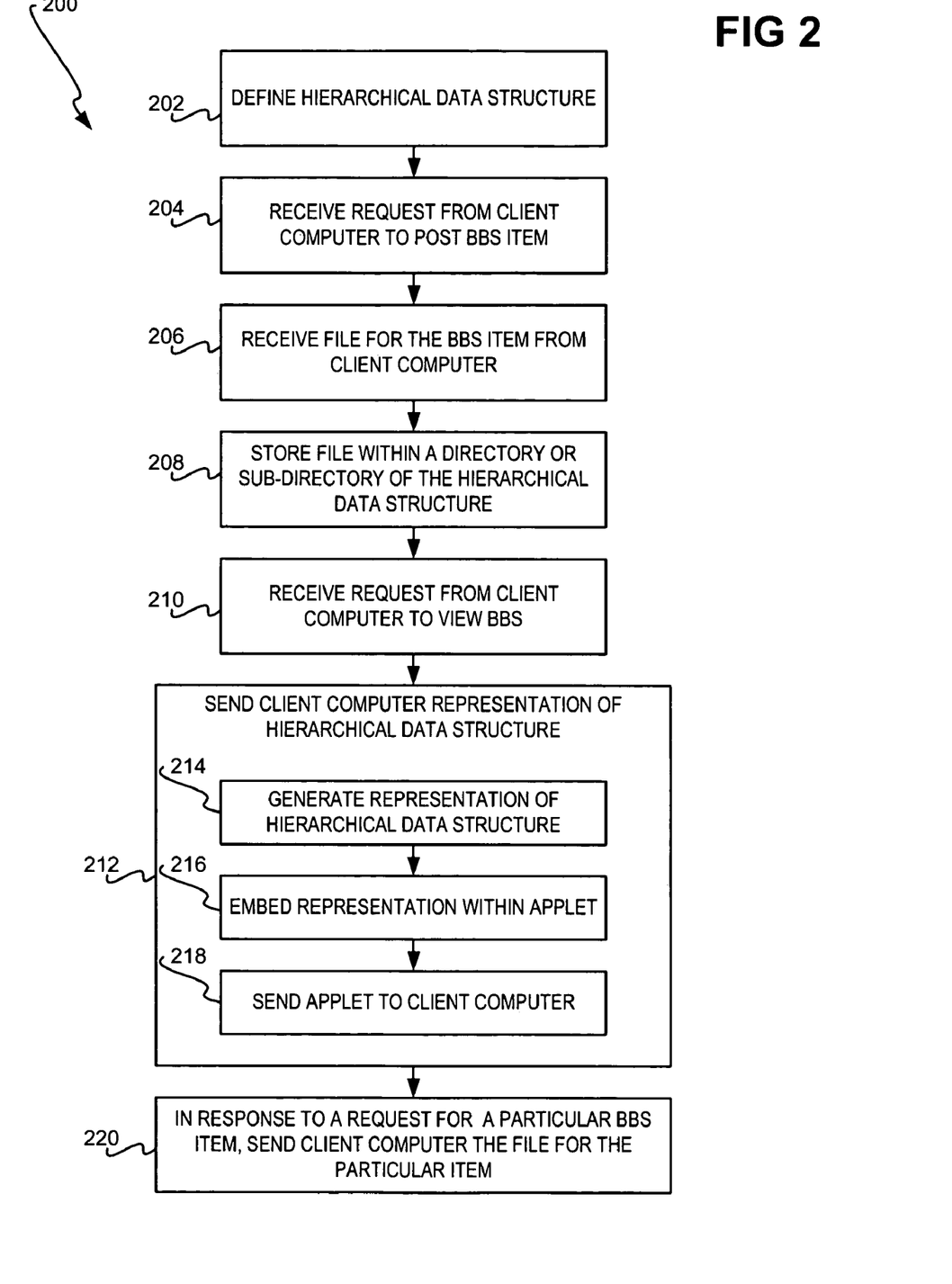
FIG. 2 is a flowchart of a method that provides an overview of the manner by which a BBS can be implemented and used, according to an embodiment of the invention.

FIG. 2 shows a method 200 that provides an overview of the manner by which a BBS can be implemented and used, according to an embodiment of the invention. First, the hierarchical data structure is defined (202). As has been described, the hierarchical data structure has directories and sub-directories into which BBS items are individually storable as files in accordance with a native file system of a server computer, where the files are directly openable and viewable by application computer programs. The hierarchical data structure does not have to be completely defined in 202. For instance, only a few directories and sub-directories may be initially defined, where additional directories and sub-directories can be added or removed later as desired.

The server computer on which the BBS items are stored via a storage device thereof or communicatively connected thereto may receive a request from a client computer to post a BBS item (204). This request may be received from a web browser computer program running on the client computer, for instance. Part of receiving this request may include sending an applet to the client computer that is configured to allow a user at the client computer to navigate a native file system of the client computer to select the file of the BBS item to be posted to the BBS. In response, the server computer receives a file for the BBS item from the client computer (206), and stores the file within a specified directory or sub-directory of the hierarchical data structure (208). The directory or sub-directory may further be specified by the user at the client computer via the applet running in the context of the web browser computer program.

The server computer may also receive a request from a client to view the BBS (210), such as from a web browser computer program running on the client computer. In response, the server computer first sends the client computer a representation of the hierarchical data structure (212). That is, the server computer sends the client computer data representative of the hierarchical data structure. For instance, the hierarchical data structure may be sent as an eXtensible Markup Language (XML) data file, or as another type of data file. For this to be accomplished, the server computer may first generate the representation of the hierarchical data structure (214), embed this representation within an applet (216), and send the applet to the client computer over a network (218).

The user at the client computer is therefore able to navigate and select the BBS items, where the client computer, such as the applet running within a web browser computer program thereon, displays the directories and sub-directories of the hierarchical directory structure. Such display may be accomplished in a collapsible and expandable manner, so that a user can determine which directories, for instance, should be "expanded" so that the contents thereof are displayed, and which directories should be "collapsed" so that the contents thereof are not displayed, as can be appreciated by those of ordinary skill within the art. Once a particular BBS item has been requested, the server computer sends the client computer the file for this item (220), so that it can be viewed using an application computer program at the client computer.

Figure 3:
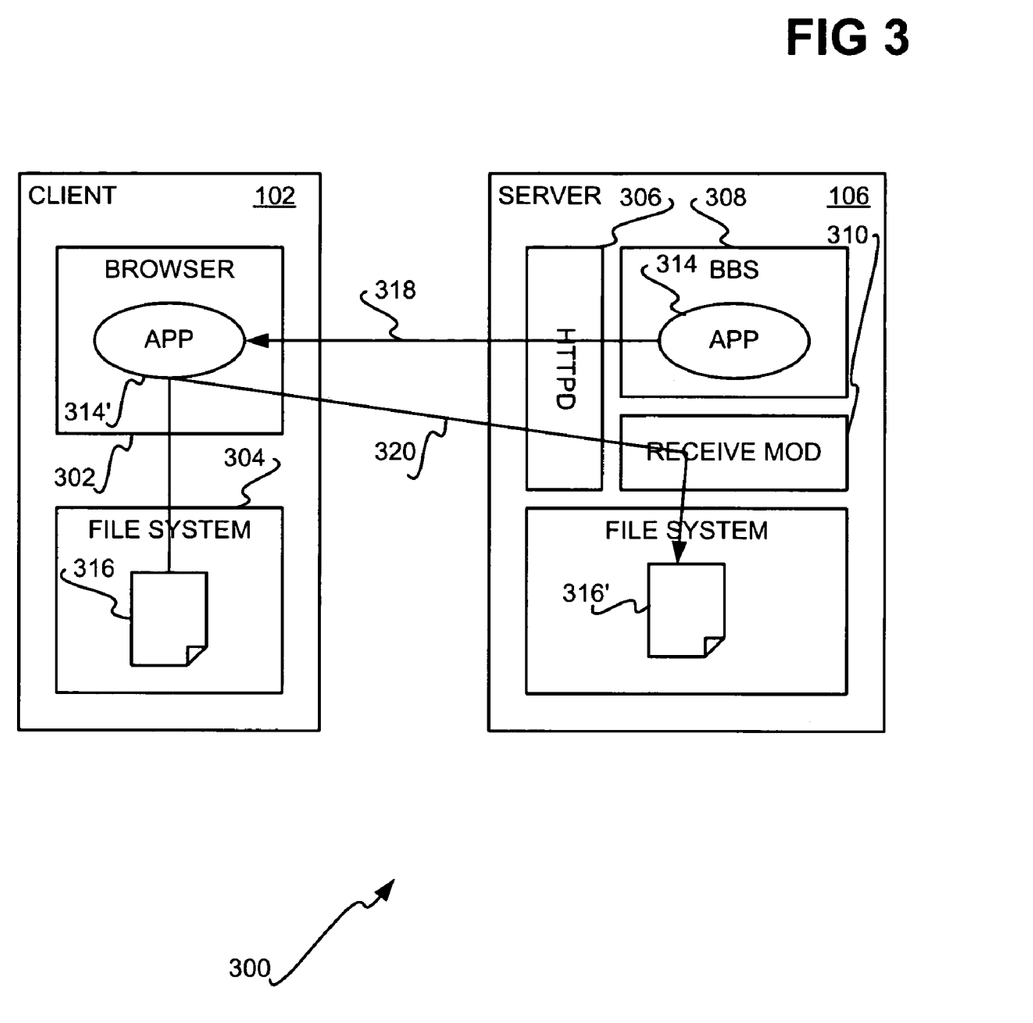
FIG. 3 is a diagram depicting how a BBS item may be posted to a BBS, according to an embodiment of the invention.

FIG. 3 shows an example 300 for posting a BBS item to a BBS, according to an embodiment of the invention. The client computing device 102 includes a web browser computer program 302 and a native file system 304. The server computing device 106 includes a hypertext transport protocol (HTTP) daemon 306, or another type of HTTP server computer program, the BBS 308, a receiving module 310 that may be part of the BBS 308, and a native file system 312. The network 104 of FIG. 1 is implied in FIG. 3, but is not displayed in the example 300 of FIG. 3 for illustrative clarity and simplicity.

First, an applet computer program 314 is sent from the BBS 308, via the HTTP daemon 306 of the server computer device 106, to the web browser computer program 302 of the client computer device 102, as the applet computer program 314', as indicated by the arrow 318. The applet computer program 314' is configured to allow a user at the client computer device 102 to navigate the file system 304 to select a file 316 representing the BBS item to be posted to the BBS 308. The program 314' is further configured to allow a user to select the sub-directory or directory destination within the hierarchical directory structure of the BBS 308, which is not depicted in FIG. 3.

Once such navigation and selection has been made, the file 316 is sent via the applet computer program 314' of the web browser computer program 302 of the client computer device 102, through the HTTP daemon 306 of the server computer device 106, to the receiving module 310, which stores the file 316' within the native file system 312, as indicated by the arrow 320. The receiving module 310 stores the file 316' within the native file system 312 at the location desired by the user of the client computer device 102 in one embodiment. In another embodiment, the destination for the file 316' that represents the BBS item to be posted within the BBS 308 is preselected for the user.

Figure 4:
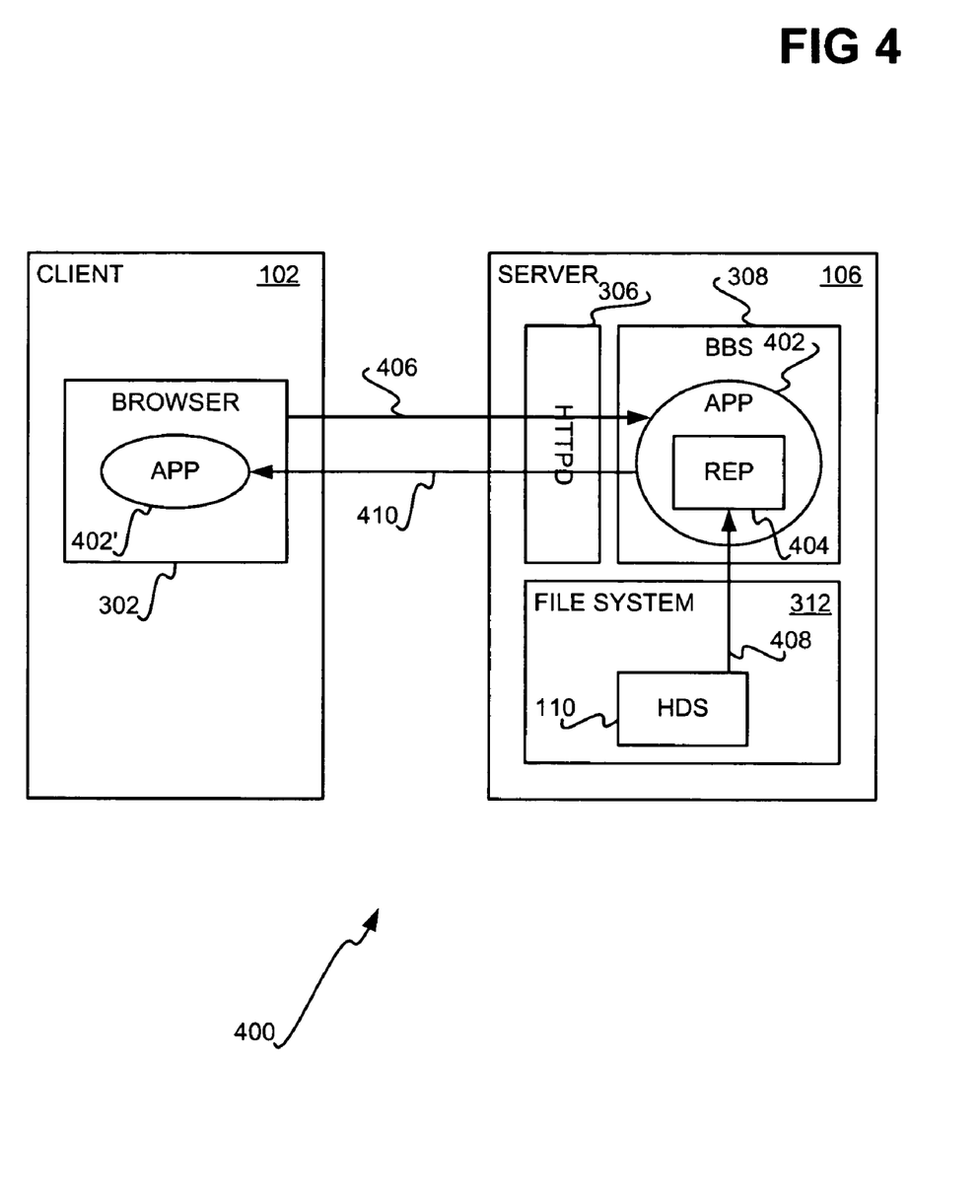
FIG. 4 is a diagram depicting how a BBS may be viewed at a client computer device, according to an embodiment of the invention.

FIG. 4 shows an example 400 for viewing a BBS, according to an embodiment of the invention. The client computing device 102 includes the web browser computer program 302. The server computing device 106 includes the HTTP daemon 306, the BBS 308, and the native file system 312. The network 104 of FIG. 1 is implied in FIG. 4, but is not display in the example 400 of FIG. 4 for illustrative clarity and simplicity.

First, the web browser computer program 302 requests the applet computer program 402 from the BBS 308 at the server computer device 106, through the HTTP daemon 306, as indicated by the arrow 406. The applet computer program 402 is configured so as to permit a user at the client computer device 102 to navigate the hierarchical data structure 110 of the BBS 308 as formatted in accordance with the native file system 312 of the server computer device 106. The applet computer program 402 is further configured to permit a user to select a file within the hierarchical data structure 110, which is then downloaded to the client computer device 102 for viewing at the device 102.

In response, the BBS 308 generates a representation 404 of the hierarchical data structure 110 within which BBS items are individually stored as files in accordance with the native file system 312 of the server computer device 106. This representation 404 is embedded within the applet computer program 402, as indicated by the arrow 408. The applet computer program 402 is then sent to the web browser computer program 302 of the client computer device 102 from the server computer device 106 through the HTTP daemon 306, as indicated by the arrow 410. The copy of the applet computer program 402 at the client computer device 102 is indicated as the applet computer program 402'. The user can now navigate and select files within the hierarchical data structure 110, due to the representation 404 having been copied to the client computer device 102 as part of the program 402'.

Figure 5:
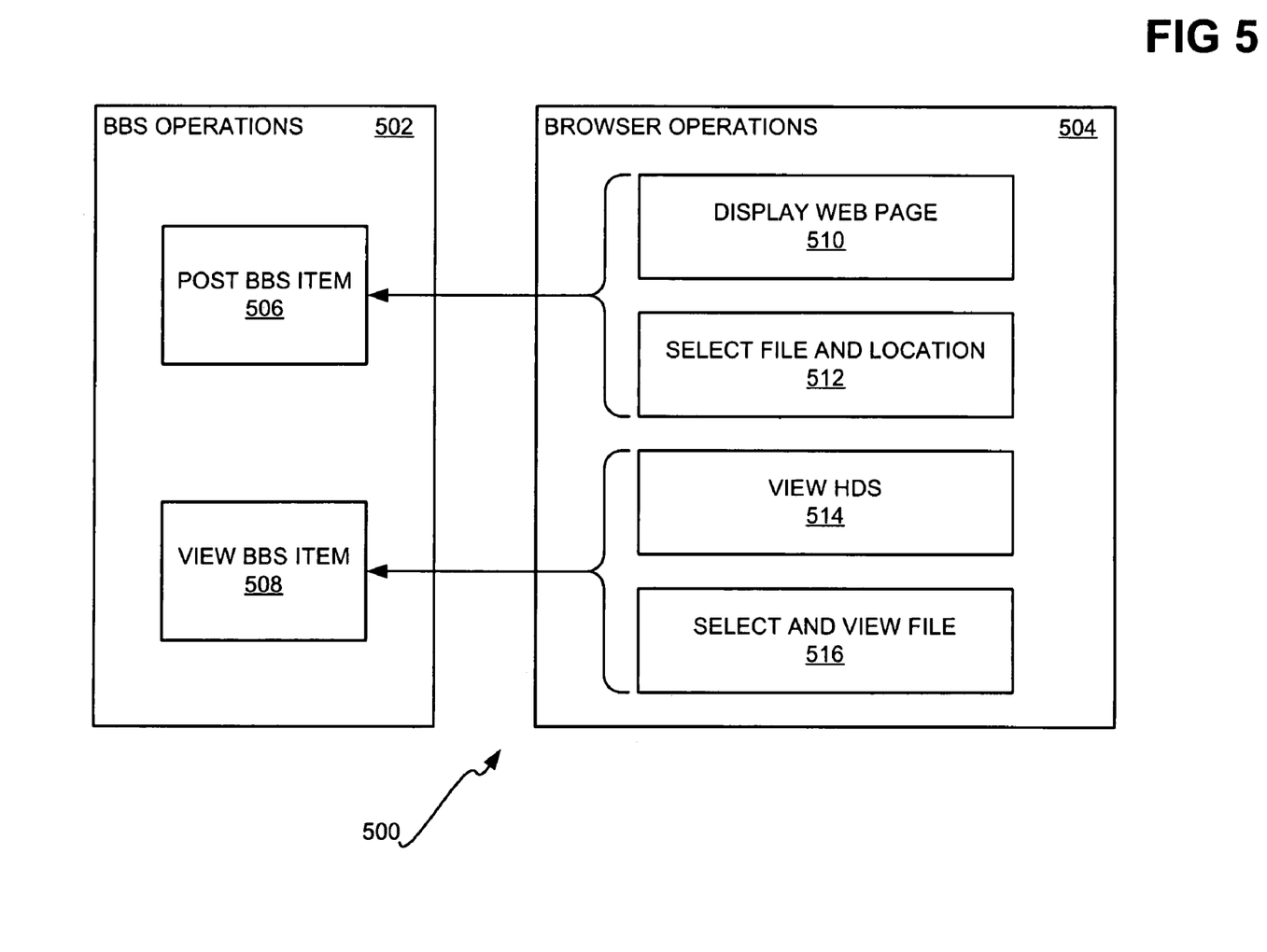
FIG. 5 is a diagram illustratively depicting how different BBS operations are achieved via operations performed in a web browser computer program at the client computer device, according to an embodiment of the invention.

FIG. 5 illustratively shows a diagram 500 as to how different BBS operations are achieved via operations performed in a web browser computer program at the client computer device, according to an embodiment of the invention. The BBS operations 502 include posting a BBS item, as indicated by the reference number 506, and viewing a BBS item, as indicated by the reference number 508. Posting a BBS item involves at least two of the browser operations 504. As indicated by the reference number 510, a web page is first displayed. Next, as indicated by the reference number 512, the user selects a file as that BBS item, and a location within the hierarchical data structure of the native file system of the server computer device for that file. Viewing a BBS item also involves at least two of the browser operations 504. First, as indicated by the reference number 514, the user views the hierarchical data structure of the BBS on a web page. Next, as indicated by the reference number 516, the user navigates the hierarchical data structure, selects a BBS item, and views the file for that item.

Figure 6:
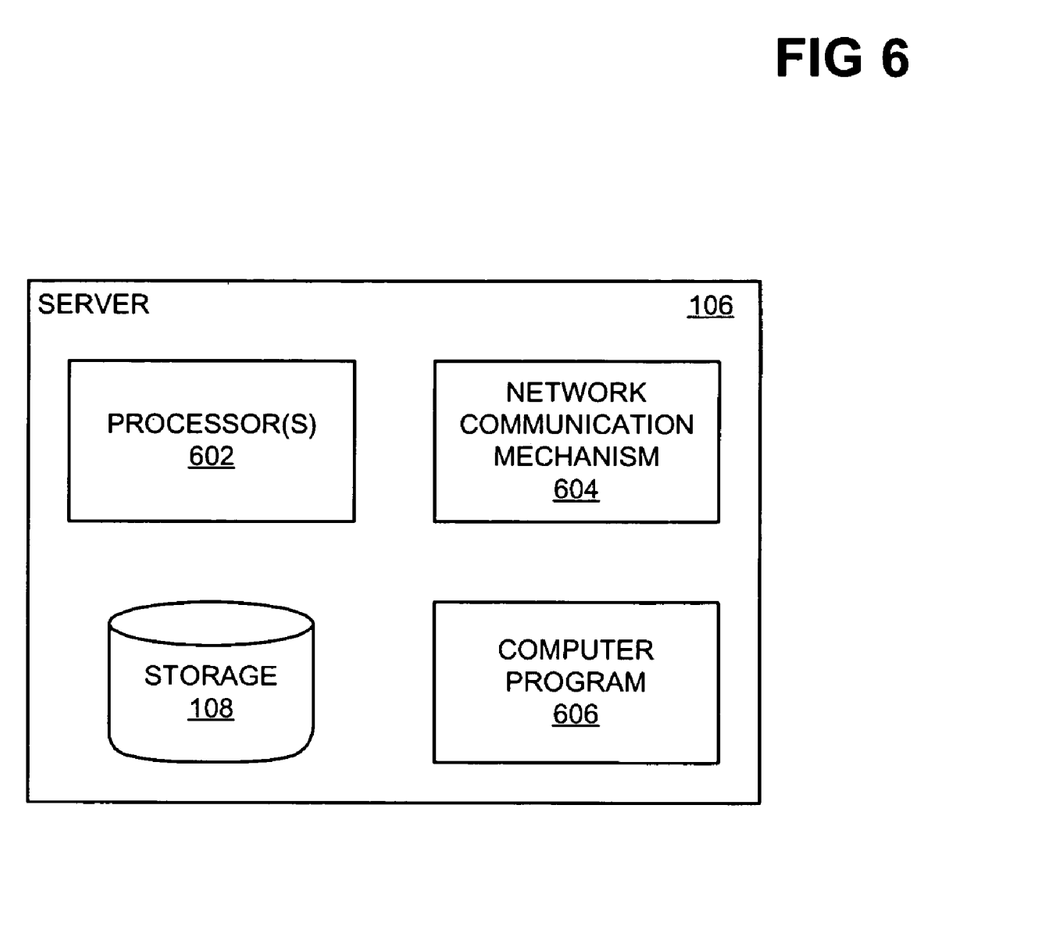
FIG. 6 is a block diagram of a representative implementation of a server computer device, according to an embodiment of the invention.

FIG. 6 shows an example implementation of the server computing device 106, according to an embodiment of the invention. The server computing device 106 is depicted in FIG. 6 as including one or more processors 602, a network communication mechanism 604, the storage device 108, and a computer program 606. As can be appreciated by those of ordinary skill within the art, the server computing device 106 may further include other components, in addition to and/or in lieu of those depicted in FIG. 6.

The processors 602 execute the computer program 606. The network communication mechanism 604 may be a network adapter or another type of network communication mechanism that enables the server computing device 106 to communicate over the network 104 of FIG. 1. The storage device 108 stores the BBS items as individual files within a hierarchical directory structure, in accordance with the native file system of the server computing device 106, as has been described. The computer program 606 is to receive from client computing devices the BBS items to store as the individual files within the hierarchical directory structure. The program 606 is further to send to the client computing devices a representation of the hierarchical directory structure, as has been described, as well as the individual files for the BBS items as requested by the client computing devices.

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. Therefore, it is manifestly intended that this invention be limited only by the claims and equivalents thereof.

We claim:

1. A method for implementing a bulletin board system (BBS) on a server computer without employing database management software (DBMS), and by employing a native file system of the server computer, the method comprising:

defining a hierarchical directory structure having a plurality of directories and sub-directories into which a plurality of BBS items are individually storable as files in accordance with the native file system of the server computer such that the files are directly openable and viewable by one or more application computer programs not associated with the BBS and such that the files as stored do not have to be extracted by the BBS before being opened by the application computer programs, where formats of the files are specified by the application computer programs and are not specified by the BBS, and where the hierarchical directory structure is implemented within the native filesystem and not within the BBS;

in response to receiving a request from a client computer to post a BBS item on the BBS, receiving for the BBS item received an individually storable file from the client computer, the file directly openable and viewable by the one or more application computer programs;

storing the file for the BBS item within one of the directories and sub-directories of the hierarchical directory structure as specified by the client computer;

in response to a request from a client computer to view the BBS, sending the client computer a representation of the hierarchical directory structure, including filenames of the files for the BBS items stored within the directories and sub-directories of the hierarchical directory structure, the representation sent to the client computer being a complete representation of the hierarchical directory structure in that all the directories, all the sub-directories, and the filenames of all the files for the BBS items are sent to the client computer in response to the request from the client computer; and, in response to receiving a request from the client computer for a particular BBS item, sending the client computer the file for the particular BBS item.

2. The method of claim 1, wherein the file for each BBS item has a filename descriptive of contents of the BBS item in a humanly understandable manner.

3. The method of claim 2, wherein the filename of the file for each BBS item includes a date at which the BBS item was posted to the BBS.

4. The method of claim 1, wherein the request from the client computer to post the BBS item on the BBS and the request from the client computer to view the BBS are each received from a web browser computer program running on the client computer.

5. The method of claim 1, wherein receiving the request from the client computer to post the BBS item on the BBS comprises sending an applet to the client computer, the applet configured to allow a user at the client computer to navigate a native file system of the client computer to select the file of the BBS item to be posted.

6. The method of claim 1, wherein receiving the request from the client computer to view the BBS comprises:

generating the representation of the hierarchical directory structure;

embedding the representation of the hierarchical directory structure with an applet; and, sending the applet to the client computer, the applet configured to allow a user at the client computer to navigate the hierarchical directory structure to select the file for the particular BBS item for sending to the client computer.

7. The method of claim 1, wherein the method is implemented at the server computer system using one or more of the Java computer programming language, Java server pages (JSP's), and JavaBean software components.

8. A system comprising: one or more processors;

a network;

a server computer communicatively coupled to the network, the server computer having a bulletin board system (BBS) implemented thereon without use of database management software (DBMS) and by employing a native filesystem of the server computer, and in which a plurality of BBS items are stored as individually storable files within a hierarchical directory structure having a plurality of a directories and sub-directories, using the native file system of the server computer, such that the files are directly openable and viewable by one or more application computer programs not associated with the BBS and such that the files as stored do not have to be extracted by the BBS before being opened by the application computer programs, where formats of the files are specified by the application computer programs and are not specified by the BBS, and where the hierarchical directory structure is implemented within the native filesystem and not within the BBS; and, one or more client computers communicatively coupled to the network, each client computer able to send requests to the server computer over the network to view the BBS, such that the client computer receives from the server computer in response a representation of the hierarchical directory structure, including filenames of the files for the BBS items stored within the directories and sub-directories of the hierarchical directory structure, the representation sent to the client computers being a complete representation of the hierarchical directory structure in that all the directories, all the sub-directories, and all the filenames of all the files for the BBS items are sent to the client computers in response to the requests.

9. The system of claim 8, wherein the file for each BBS item has a filename descriptive of contents of the BBS item in a humanly understandable manner, including a date at which the BBS item was posted to the BBS.

10. The system of claim 8, wherein each client computer, upon receiving the representation of the hierarchical directory structure from the server computer, enables a user to navigate and select the BBS items by displaying the hierarchical directory structure in a collapsible and expandable manner, and by displaying the filenames of the files for the BBS items such that filename extensions of the files are suppressed.

11. The system of claim 8, wherein each client computer is further able to send requests for particular BBS items denoted within the representation of the hierarchical directory structure, such that the client computer receives from the server computer in response the file for the particular BBS item for viewing on the client computer.

12. The system of claim 8, wherein each of at least one of the computers is further able to post the BBS items to the BBS by sending the files for the BBS items to the server computer for storage by the server computer within the hierarchical directory structure.

13. The system of claim 8, wherein each client computer interacts with the server computer via one or more applets running via a web browser computer program on the client computer.

14. A server computer comprising:
one or more processors;
a network communication mechanism to communicatively couple the server computer to a network;
a storage device to store a plurality of bulletin board system (BBS) items as individual files within a hierarchical directory structure without use of database management software (DBMS) and by employing a native filesystem of the server computer, the hierarchical data structure having a plurality of directories and sub-directories, in accordance with the native file system of the server computer, the files directly openable and viewable by one or more computer programs not associated with the BBS and such that the files as stored do not have to be extracted by the BBS before being opened by the application computer programs, where formats of the files are specified by the application computer programs and are not specified by the BBS, and where the hierarchical directory structure is implemented within the native filesystem and not within the BBS; and,
a computer program executed by the processors to receive from client computers over the network the BBS items to store as the individual files within the hierarchical directory structure and to send to the client computers over the network a representation of the hierarchical directory structure and the individual files for particular of the BBS items requested by the client computers, the representation sent to the client computers being a complete representation of the hierarchical directory structure in that all the directories, all the sub-directories, and all the filenames of all the files for the BBS items are sent to the client computers in response to the requests.

15. The server computer of claim 14, wherein the file for each BBS item has a filename descriptive of contents of the BBS item in a humanly understandable manner, including a date at which the BBS item was posted to the BBS.

16. The server computer of claim 14, wherein the server computer interacts with each client computer via one or more applets sent by the server computer to the client computer and running via a web browser computer program on the client computer.

17. An article of manufacture comprising:
a recordable data storage medium; and,
means in the recordable data storage medium for implementing a bulletin board system (BBS) on a server computer using a native file system of the server computer to store a plurality of BBS items as individually storable files within a hierarchical directory structure having a plurality of directories and sub-directories,
wherein the files are directly openable and viewable by one or more application computer programs not associated with the BBS such that the files as stored do not have to be extracted by the BBS before being opened by the application computer programs, where formats of the files are specified by the application computer programs and are not specified by the BBS, and where the hierarchical directory structure is implemented within the native filesystem and not within the BBS,
wherein the means is responsive to requests by client computers, such that the client computers receive in response a representation of the hierarchical directory structure, including filenames of the files for the BBS items stored within the directories and sub-directories of the hierarchical directory structure, the representation sent to the client computers being a complete representation of the hierarchical directory structure in that all the directories, all the sub-directories, and all the filenames of all the files for the BBS items are sent to the client computers in response to the requests.

\* \* \* \* \*